Patented Jan. 9, 1951

2,537,857

UNITED STATES PATENT OFFICE 2,537,857

COUPLING OF AMINES BY MEANS OF DI-TERTIARY-ALKYL PEROXIDES

John H. Raley and Frank H. Seubold, Jr., Berkeley, Calif., assignors to Shell Development Company, San Francisco, Calif., a corporation of Delaware No Drawing. Application July 17, 1948,
Serial No. 39,381

7 Claims. (Cl. 260—268)

This invention relates to the coupling of organic amines, i e., to the formation of carbon-to-carbon linkages between molecules of the organic amine. More particularly, the invention provides a process for the production of organic diamines from monoamines, and in a specific embodiment provides a novel series of heterocyclic diamines and a method for their production.

With the exception of certain rather specific decomposition reactions, organic diamines and polyamines have heretofore been prepared by the same general types of reaction employed for the preparation of monoamines. In general, organic amines, including primary, secondary, tertiary, mono and polyamines, have been prepared by reactions such as the treatment of alkyl halides with ammonia, the hydrogenation of carbonyl compounds in the presence of ammonia or amines, the reduction of nitro-compounds and the like. Heretofore monoamines, unless they contained functional groups capable of undergoing reactions analogous to those generally employed in the preparation of a monoamine, have not been employed in the synthesis of diamines.

An object of the present invention is to provide a method of forming carbon-to-carbon bonds between the molecules of organic amines. Another object is to provide a process for the production of diamines from monoamines. A further object is to provide a novel class of heterocyclic diamines and a method for their preparation. Still other objects and advantages of the invention will be apparent from the following description.

We have now discovered that when an organic amine is brought into contact with a hydrocarbonoxy free radical, i. e., a free radical of the general formula R—O— where R is a hydrocarbon radical (a monovalent organic radical composed solely of carbon and hydrogen), carbon-to-carbon bonds are formed between molecules of the amine.

The above discovery is particularly surprising in view of the known reactions of organic amines when brought into contact with organic free radicals. The thermal decomposition of benzoyl peroxide is a commonly employed method of producing organic free radicals, and the reactions of numerous organic materials when contacted with the free radicals formed by the decomposition of benzoyl peroxide have been reported in the literature. In a recent paper, J. Am. Chem. Soc. 69, 2299 (1947), Bartlett and Nozaki reported their investigations of the decomposition of benzoyl peroxide in various solvents and summarized similar investigations of other authors. It is there reported that many amines such as aniline, triethylamine, and n-butylamine react explosively when benzoyl peroxide is dissolved in them and heated to its decomposition temperature, i. e., when the amines are contacted with the organic free radicals formed by decomposing benzoyl peroxide. From an analysis of the reaction products formed from less violently reactive amines these investigators conclude that, when an amine is contacted with free radicals it appears that the nitrogen-hydrogen bond is attacked if there is one present; otherwise a carbon-nitrogen bond breaks.

Numerous free radical initiated reactions, such as polymerization, addition, and the like reactions, produce the same products whether the source of the free radicals is a decomposing diacyl peroxide or a peroxide of the class defined below. However, we have now made the surprising discovery that contacting organic amines with the free radicals formed by the latter class of peroxides initiates an entirely different type of reaction from that which occurs when the amine is contacted with the free radicals formed by a diacyl peroxide.

As shown by the above investigators, a decomposing diacyl peroxide ruptures a nitrogen bond of the amine and initiates the formation of diazo compounds or Schiff bases, in many cases by an explosively violent reaction. Diacyl peroxides are compounds of the general formula

where R represents a hydrocarbon radical, and their initial decomposition products are acyloxy free radicals of the general formula RC(O)O—. For example, benzoyl peroxide,

initially decomposes into two benzoyloxy radicals of the formula $C_6H_5C(O)O-$.

On the other hand we have found that decomposing peroxides which form among their initial decomposition products, hydrocarbonoxy free radicals, rupture carbon-to-hydrogen bonds rather than nitrogen bonds. In further contrast to the above, with peroxides of this class the reaction proceeds smoothly and controllably to produce valuable open chain or cyclic polyamines. Thus the present invention provides a process for the formation of carbon-to-carbon bonds between molecules of an amine which comprises bringing an organic peroxide which yields hydrocarbonoxy free radicals among its initial decomposition products into contact with the amine at the decomposition temperature of the peroxide.

The process of the invention is preferably conducted in the liquid phase, and although substantially any desired reaction pressure may be employed, the use of a reduced pressure can provide but little advantage. Thus, except where a component of the reaction mixture is volatile at the reaction temperature, the use of atmospheric pressure is preferred. Where it is desired to employ as a component of the reaction mixture a compound which is normally volatile at the temperature at which it is desirable to conduct the reaction, the use of superatmospheric pressure is preferred. In general, the peroxides and amines which are sufficiently reactive to provide high yields of product in a short reaction time at a moderate temperature are those which are normally liquid (compounds which are liquid at about 20° C. under atmospheric pressure), and the employment of such normally liquid reactants is preferred. However, solid reactants may suitably be employed in the present process by conducting the reaction in amounts of an inert organic solvent (for example, a saturated aliphatic hydrocarbon such as normal heptane, or normal octane, or an aromatic hydrocarbon such as benzene or toluene) sufficient to dissolve substantial portions of each reactant in a single liquid phase.

Amines which are suitable for employment in the present process are members of the class of organic amines, including polyamines, in which at least one trivalent nitrogen atom is linked by single bonds to three atoms. Amines of the above class in which trivalent nitrogen atoms linked by single bonds to three atoms comprise the only functional group, and which amines contain at least one hydrogen atom attached to a carbon atom linked to nitrogen comprise a preferred class of reactants. Illustrative examples of the amines which are suitable for employment include, aliphatic amines such as:

Isopropylamine
Tri-n-butylamine
N-methyl tertiary-butylamine
Allylamine
N-cyclohexyl butylamine
N-2-propynyl ethylamine
N-chloromethyl isopropylamine
Piperidine
Piperazine
N-(3-allylamino) heptylamine and aromatic amines such as:

N-benzyl aniline
N, N-dimethyl aniline
N-pentyl meta-toluidine
N-allyl 1-naphthylamine
N-2-propynyl aniline
N-biphenylyl benzylamine
N-methyl 4-bromoaniline
N-4-butylamino benzylamine
Tribenzylamine In the production of diamines from monoamines the preferred starting materials consist of monoamines in which the hydrocarbon radicals attached to the nitrogen atom are free of aliphatic carbon-to-carbon multiple bonds and which monoamines contain at least one hydrogen atom attached to a carbon atom linked to nitrogen.

The preparation of a novel class of heterocyclic diamines, the octahydrocarbon-substituted piperazines, is one specific embodiment of the present invention. The octahydrocarbon-substituted piperazines are prepared by employing in the process of the invention a primary unsubstituted amine containing a single hydrogen atom attached to the carbon atom linked to nitrogen, i. e., an amine of the general formula, $(R)_2CH-NH_2$ where R is a hydrocarbon radical. Illustrative examples of amines which are suitable starting materials for the preparation of octahydrocarbon-substituted piperazines include:

Isopropylamine
1-phenylethylamine
1-methylbutylamine
1-cyclohexylethylamine
1-vinylpropylamine
1-ethynylpropylamine and the like. The normally liquid alkylamines containing a single hyrogen atom attached to the carbon atom linked to nitrogen, as typified by isopropylamine, are particularly preferred starting materials and their employment results in the production of good yields of octa-alkylpiperazines.

Organic peroxides which are suitable for employment in the present process are those which when thermally decomposed produce hydrocarbonoxy free radicals among their initial decomposition products. Organic peroxides in which at least one of the radicals attached to the peroxy group is a hydrocarbon radical comprise a generally suitable class of peroxide reactants. Illustrative examples of suitable peroxide reactants include the organic peroxides in which the free valencies of the peroxy radical (—O—O—) are satisfied by attachment to hydrocarbon radicals, and their analogs in which one hydrocarbon radical contains polar substituents such as:

Di-tertiary-amyl peroxide
Chloro-di-tertiary-butyl peroxide
Diethyl peroxide
Diamyl peroxide
Dicyclohexyl peroxide
Allyl tertiary-butyl peroxide
Cumyl teritary-butyl peroxide
Isopropyl tertiary-butyl peroxide bis(peroxy) alkanes, of the formula $R-O-O-(alkane)-O-O-R^1$ in which R and $R^1$ represent hydrocarbon radicals, and their analogs in which the alkane residue or one of the hydrocarbon radicals represented by R and $R^1$ contains polar substituents such as:

2,2-bis(tertiary-butylperoxy) butane
2-methylperoxy-2-tertiary-butylperoxy-propane
2,2-bis(chloro-tertiary-butylperoxy) pentane
Phenyl-bis(tertiary-butylperoxy) methane
2,2-bis(tertiary-butylperoxy)-3-chloro-propane and peresters of unsubstituted alcohol, such as:

Tertiary-butyl perbenzoate
Tertiary-butyl perlaurate
Di-tertiary-butyl dipermalonate
Ethyl perbenzoate The term "lower hydrocarbon peroxide" is used herein and in the appended claims to refer to the organic peroxides, illustrated above, in which one of the valencies of the peroxy radical (—O—O—) is satisfied by direct attachment to a hydrocarbon radical and the second free valency of said peroxy radical is satisfied by direct attachment to a hydrocarbon radical that may bear one or more substituents that do not detract from the essentially hydrocarbon character of said radical, e. g., a halogen atom, or to the acyl radical of a lower carboxylic acid. "Unsubstituted hydrocarbon peroxides" in which at least one teritary-alkyl radical is attached to the peroxy group, such as di-tertiary butyl peroxide, 2,2-bis(tertiary-butylperoxy)butane, and tertiary-butyl perbenzoate are particularly preferred reactants, and the di-tertiary-alkyl peroxides such as di-tertiary-butyl peroxide are especially suitable for employment in the present process. The term "unsubstituted hydrocarbon peroxides" is employed to mean peroxides in which the peroxy group —O—O— is linked solely to hydrocarbon radicals or to one hydrocarbon radical and to one unsubstituted acyl radical (an acyl radical of the formula RC(O)— where R is a hydrocarbon radical).

The temperature at which the coupling reaction is conducted may be varied over wide limits by the choice of suitable peroxide reactants, but temperatures from 0° C. to about 200° C. are generally preferable. In general, the reaction proceeds more rapidly at elevated temperatures, and the temperature range of from about 100° C. to 150° C. has been found particularly suitable for the process of the invention. As the reaction is dependent upon the amine being contacted with free radicals, to conduct the reaction at any given temperature it is preferable to employ a peroxide which decomposes at about that temperature. The decomposition temperature (the recommended temperature ranges for their use) of organic peroxides are determinable properties and are in many cases known to the art. For example, U. S. Patent No. 2,379,218 describes numerous suitable organic peroxides and the recommended temperature ranges for their use, including:

|  | °C. |
|---|---|
| Diethyl percarbonate | 45 to 70 |
| Allyl percarbonate | 50 to 80 |
| Methyl n-amyl ketone peroxide | 110 to 135 |
| Methyl isobutyl ketone peroxide | 110 to 135 |
| Ethyl peroxide | 125 to 145 |
| Methyl isobutyl peroxide | 130 to 150 |
| Dicyclohexyl peroxide | 150 |

The decomposition temperature of typical peroxides of the particularly preferred class include:

|  | °C. |
|---|---|
| Di-tertiary-butyl diperoxalate | 0 to 40 |
| Di-tertiary-butyl dipermalonate | 20 to 60 |
| Tertiary-butyl perbenzoate | 75 to 115 |
| 2,2-bis(tertiary-butylperoxy)butane | 80 to 120 |
| Di-tertiary-butyl peroxide | 115 to 150 |

The process of the invention may be conducted in substantially any reaction vessel capable of retaining organic liquids and may be conducted in a batchwise or continuous manner. Either the amine or the peroxide may be employed in excess in the coupling reaction, however, it is generally more economical to employ an excess of the amine.

In general, the products of the invention are useful for the many applications to which polyamino compounds are adapted. The novel octahyrocarbon-substituted piperazines provide high boiling liquid organic bases capable of neutralizing two moles of monobasic acids, and are valuable intermediates for the synthesis of compounds not readily obtainable from other starting materials.

The following examples illustrate detailed applications of the process to the coupling of particular amines. However, as numerous variations in the particular reactants and reaction conditions are within the scope of the invention, the invention is not to be construed as being limited to the particular reactants and reaction conditions recited in the examples.

*Example I—Coupling of a symmetrical trialkylamine initiated by a di-tertiary-alkyl peroxide*

A solution of 73.0 grams of di-tertiary-butyl peroxide in 122.4 grams of tri-n-butylamine was placed in a glass vessel equipped with a condenser. With the contents under a pressure of 30 pounds per square inch the reaction vessel was heated by an external bath heated to a temperature of 135° C. The reaction vessel was allowed to remain in the bath for about 7.5 hours, during which time the temperature of the solution gradually fell to 120° C. The crude reaction product amounting to 192.6 grams was combined with water and fractionally distilled. Tertiary-butyl alcohol and di-tertiary-butyl peroxide were removed as readily volatile components. The remaining products were subjected to distillation under pressures of 30 mm. and from 3 to 5 mm. to remove the unreacted amine. A molecular distillation of the residue, 46.1 grams, yielded 35.5 grams, or 25% of the theoretically possible yield on the basis of the consumed peroxide, of an orange oil. The oil was identified as a bis(dibutylamino)octane by the following analysis:

|  | Found | Calculated for [(C$_4$H$_9$)$_2$NC$_4$H$_8$]$_2$ |
|---|---|---|
| Per cent N | 7.29 | 7.60 |
| M. W. | 376 | 368 |

The probable course of the reaction is believed to be as follows:

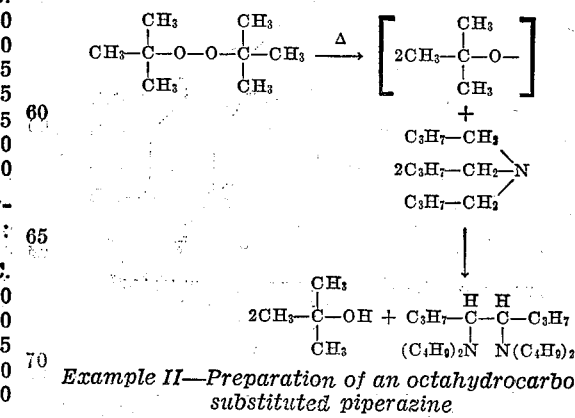

*Example II—Preparation of an octahydrocarbon-substituted piperazine*

A solution of an equivalent amount of di-tertiary-butyl peroxide in isopropyl amine (19 grams in 15 grams of the amine) was heated at 110° C.

for about 8.9 hours. A fractional distillation of the reaction products yielded a gas which was identified as ammonia by trapping it and determining its equivalent weight as ammonium chloride (found 53.5(8), calculated for ammonium chloride 53.50). The ammonia was recovered in about a 45% yield and tertiary-butyl alcohol was recovered in about a 91% yield based upon the unrecovered amine and peroxide, respectively. A vacuum distillation of the higher boiling components yielded 1.3 grams of a yellow liquid boiling at from 50 to 55° C. under 1.5 mm. pressure and having a refractive index $n_D^{20}$ 1.4710. The hydrochloride of the yellow liquid was found to have a melting point of 168-170° C., an equivalent weight of 137 by Volhard titration, and a nitrogen content of 9.2%. The yellow liquid was thus determined to be octamethylpiperazine, the dihydrochloride of which has a theoretical equivalent weight of 135.5, and a nitrogen content of 10.3, respectively.

It is therefore apparent that the hydrocarbyloxy free radicals removed the single hydrogen atom attached to a carbon atom linked to the nitrogen atom of the amine to form tertiary-butyl alcohol and tetramethyl-1,2-diaminoethane, (2,3-dimethyl-2,3-diaminobutane). This 1,2-diamino compound then condensed with the elimination of two molecules of ammonia to form octamethylpiperazine. These probable reactions are represented as follows:

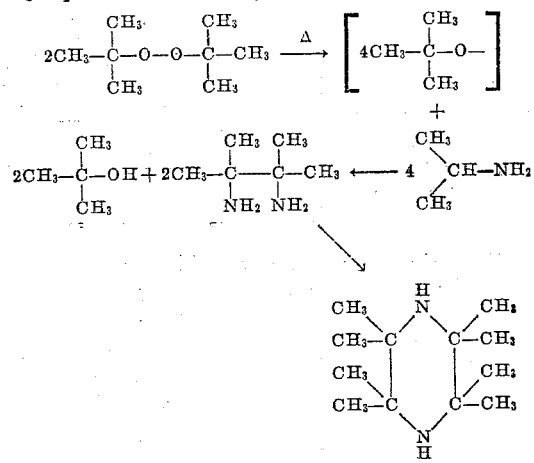

*Example III.—Coupling of a symmetrical trialkylamine*

A solution containing 0.50 mole of tributylamine and 0.12 mole of 2,2-bis(tertiary-butylperoxy)butane was heated in an oil bath at 110° C. for about 6.5 hours. The reaction products were washed with aqueous potassium hydroxide and water then dissolved in ether and converted to the amine salts by the introduction of hydrogen chloride. The amine salts were dissolved in water and converted to the free amines by the introduction of potassium hydroxide. A vacuum distillation of the amines isolated a high boiling orange-red mobile liquid which had the characteristic amine odor and properties similar to the bis(dibutylamino)octane prepared in Example I. The probable reactions are believed to be similar to those described under Example I.

*Example IV.—Coupling of an unsymmetrical trialkylamine initiated by a di-tertiary-alkyl peroxide*

A solution containing 0.55 mole of dimethylisopropylamine and 0.275 mole of di-tertiary-butyl peroxide was heated in sealed tubes at 125° C. for 25 hours. Distillation, first at atmospheric, then at reduced pressure, removed the unreacted amine, tertiary-butyl alcohol, and the unreacted peroxide from the products. A high boiling hydrocarbon was then added to furnish still bottoms and the distillation was continued. A subsequent separation of the amino products from the hydrocarbon by an extraction with dilute hydrochloric acid produced a dark high boiling oil having the characteristic amine odor. The reactions occurring may be represented by the following equations:

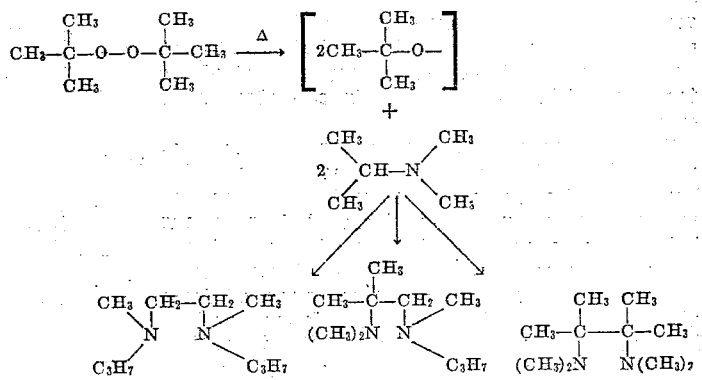

Although we have presented herein various equations representing what are believed to be the probable reactions, it will be appreciated that we do not wish to limit the invention according to any theory or mechanism that may be set forth by way of explanation on theoretical grounds of the results that have been observed. The reactions occurring in the process of the invention are evidently complex; the possible reactions have been described only with the object of facilitating an understanding of the invention, and not with the object of limiting the invention.

The invention claimed is:

1. A process for the production of bis(dibutylamino)octane which comprises heating to a temperature of from 115° C. to 150° C. a solution of tributylamine and di-tertiary-butyl peroxide and recovering said bis(dibutylamino)octane from the resulting mixture.

2. A process for the production of C-substituted octamethylpiperazine by heating to a temperature of from 115° C. to 150° C. a solution of isopropylamine and di-tertiary-butyl peroxide and distilling ammonia from the products of the reaction between the isopropylamine amine and the di-tertiary-butyl peroxide.

3. A process for the production of a C-substituted octa-alkylpiperazine by heating a solution of a normally liquid lower primary alkylamine containing but a single hydrogen atom attached to the carbon atom that is directly bonded to the nitrogen atom and a di-tertiary-alkyl peroxide to the decomposition temperature of the di-tertiary-alkyl peroxide and distilling ammonia from the products of the reaction between the amine and the di-tertiary-alkyl peroxide.

4. A coupling process, which comprises, reacting a trialkylamine containing at least one hydrogen atom attached to a carbon atom linked to nitrogen to unite two molecules of said alkyl amine by a carbon-to-carbon bond to produce a saturated vicinal diamine, by heating a solution of said trialkylamine and a di-tertiary-alkyl peroxide to the decomposition temperature of said di-tertiary-alkyl peroxide.

5. A coupling process, which comprises, reacting a trialkylamine in which one of the alkyl radicals attached to the nitrogen atom is a secondary alkyl radical to unite two molecules of said amine by carbon-to-carbon bonds to produce a saturated vicinal diamine, by heating a solution of said amine and a di-tertiary-alkyl peroxide to the decomposition temperature of the peroxide.

6. A coupling process, which comprises, reacting a normally liquid saturated hydrocarbon amine, containing at least one hydrogen atom attached to a carbon atom linked to nitrogen, to unite separate molecules of said amine by carbon-to-carbon bonds between carbon atoms directly linked to nitrogen in the respective molecules, by heating a solution of said amine and a lower saturated unsubstituted hydrocarbon peroxide to the decomposition temperature of the peroxide.

7. A process for the production of polyamines, which comprises, heating a solution of a lower saturated hydrocarbon amine in which there is present at least one hydrogen atom directly attached to a carbon atom linked to nitrogen and a lower hydrocarbon peroxide to the decomposition temperature of the peroxide to produce a saturated hydrocarbon polyamine by the direct union of separate molecules of said lower saturated hydrocarbon amine.

JOHN H. RALEY.
FRANK H. SEUBOLD, Jr.

REFERENCES CITED

The following references are of record in the file of this patent:

UNITED STATES PATENTS

| Number | Name | Date |
|---|---|---|
| 2,400,022 | Pollard et al. | May 7, 1946 |